United States Patent
Ciampolini

[15] 3,661,014
[45] May 9, 1972

[54] METHOD AND APPARATUS FOR DETERMINING IRREGULARITIES IN THE BEHAVIOR OF TIRES ROTATING UNDER LOAD

[72] Inventor: Valerio Ciampolini, Milan, Italy
[73] Assignee: Industrie Pirelli S.p.A.
[22] Filed: Apr. 15, 1970
[21] Appl. No.: 28,625

[30] Foreign Application Priority Data
Apr. 23, 1969 Italy.................................15.901 A/69

[52] U.S. Cl. ...................................................73/146
[51] Int. Cl. ...........................................G01m 17/02
[58] Field of Search....................................73/146

[56] References Cited
UNITED STATES PATENTS

| | | | |
|---|---|---|---|
| 3,375,714 | 4/1968 | Bottasso | 73/146 |
| 3,500,681 | 3/1970 | Shively | 73/146 |
| 3,534,598 | 10/1970 | Hermanns et al. | 73/146 |
| 3,552,200 | 1/1971 | Hermanns et al. | 73/146 |

*Primary Examiner*—Donald O. Woodiel
*Attorney*—Stevens, Davis, Miller & Mosher

[57] ABSTRACT

The disclosure includes a method and apparatus for determining the maximum variation of the rolling radius and the slip angle during each turn of an automotive tire rotating under load. In the method, the tire under test and a rigid surface having an axis parallel to the tire axis are brought into contact and are mutually compressed by application of an elastic pressure, the cylindrical surface being capable of oscillating about at least one axis lying in its median plane and disposed perpendicular to the axis of the cylindrical surface; the tire and the cylindrical surface are oppositely rotated by controlling the rotation of one or the other; and the angular displacements of the axis of the cylindrical surface about the axis of oscillation, which are caused by variations of the lateral thrust during each turn of the tire in the zone of contact between the tire and the adjacent surface, are then determined. The apparatus comprises a rigid cylinder rotatable about an associated shaft and capable of oscillating about an axle lying in its median plane and disposed perpendicular to the shaft. Such apparatus also includes an element adapted to produce elastic compression between the tire and cylinder and means for determining the angular displacements of the axis of the shaft about the axis of oscillation, which displacements are caused by variations of the lateral thrust which occurs during each turn of the tire in the region of contact between the cylinder and tire as they are oppositely rotated.

24 Claims, 6 Drawing Figures 3,661,014

METHOD AND APPARATUS FOR DETERMINING IRREGULARITIES IN THE BEHAVIOR OF TIRES ROTATING UNDER LOAD

BACKGROUND OF THE INVENTION

1. Field of the Invention

The present invention relates to a method and an apparatus for determining irregularities in the behavior of tires rotating under load, due to their geometrical and elastic disuniformities, and in particular for determining the maximum variation of the rolling radius and of the slip angle during each turn of the tire.

2. Description of the Prior Art

As it is known to the technicians of this art, such irregularities in the tire behavior are at present determined with devices of two types.

One of them comprises a test-drum which is pushed against the tire to be tested in such a way as to have, between the axis of the tire and that of the test-drum, a certain distance which is maintained constant during the test.

Electronic transducers are applied to the shaft of the test-drum, in order to measure the radial and axial components of the reaction generated at said shaft by the variations of the rolling radius and by the lateral thrust in the zone of contact between the tire and the test-drum, while these rotate about their own axes in opposite directions.

The data read by the transducers are amplified and processed by an electronic device, which evaluates the differences between the maximum and the minimum value of the radial and lateral components of said reactions and compares them with the pre-established classification limits.

Such devices, however, cannot supply an appreciable power and require therefore the aid of amplifiers, constituted for the most part by very complicate electronic apparatuses, which have a high cost and an unsatisfactory reliability, being easily liable to get out of set.

A second type of device for the determination of the irregular behavior of tires comprises a lever which, at one of its ends, supports a parallelogram balance, carrying on its turn a test-drum, which is maintained pressed against the tire to be tested by means of an air spring. The test-drum, besides rotating about its own axis, can oscillate about a pivot on which it is journalled and which is parallel to its axis, and can displace axially by virtue of the parallelogram of the balance. A lateral spring is foreseen to measure the lateral thrust.

The axial displacement of the test-drum and the oscillations about its fulcrum are detected by means of a numerical transducer, which transmits them to a recording electronic apparatus.

The second device, although it allows a variation in the distance between the axis of the test-drum and that of the tire under test, is also completed with a relatively expensive, complicate and unreliable electronic apparatus. Moreover, its structure is such that considerable masses are concerned; they, already at a low number of revolutions, resonate in combination with the elasticity of the tire and of the pneumatic spring. Consequently, the rotational speed of the test-drum in said device cannot reach the values necessary to allow an industrial application of the device itself.

To eliminate the disadvantages ascertained in the above indicated devices, a method and an apparatus have been devised which, besides being cheaper, ensure a higher speed and a greater reliability of operation.

SUMMARY OF THE INVENTION

The object of the present invention is a method for determining irregularities in the behavior of tires rotating under load, according to which the periphery of the tire under test and a rigid cylindrical surface, whose axis is parallel to the tire axis, are brought into contact and are mutually compressed by application of an elastic pressure, said cylindrical surface being able to oscillate about at least an axis lying in its median plane and perpendicular to the axis of said surface, the tire and said cylindrical surface are placed into rotation in opposite sense by controlling the rotation of one of the two, and the angular displacements of the axis of said cylindrical surface about said axis of oscillation, which are caused by the variations of the lateral thrust, at each turn of the tire, in the zone of contact of the tire with said cylindrical surface, are determined.

If it is wished to determine also irregularities in the behavior of tires, due to variations of the rolling radius, during each turn of them under load, the mutual compression between the tire and a cylindrical surface able to oscillate also about an axis lying in a plane perpendicular to said first axis of oscillation and passing through a diametrical plane of said cylindrical surface is determined, and the angular displacements of the axis of said cylindrical surface about said second axis of oscillation are also evaluated.

A further object of the invention is an apparatus for determining irregularities in the behavior of tires rotating under load which comprises: a rigid cylinder able to rotate about its own axis and to oscillate at least about an axis lying in its median plane and perpendicular to the axis of said cylinder, an element able to produce an elastic compression between the rigid cylinder and the tire to be tested, and means able to determine the angular displacements of the axis of said cylinder about said axis of oscillation, which take place during the rotation in opposite sense of the tire and of the rigid cylinder in contact with the same consequent to the variations of the lateral thrust, during each turn of the tire, at the compression zone between said tire and said rigid cylinder.

If it is wished to determine also irregularities in the behavior of tires due to variations in the rolling radius, during each turn of the tire under load, the apparatus will comprise a rigid cylinder able to oscillate also about an axis lying in a plane perpendicular to said first axis of oscillation and passing through a diametrical plane of said cylindrical surface, and means able to determine the angular displacements of the axis of said cylinder about said second axis of oscillation.

The features and the advantages of the method and of the apparatus forming the object of the present invention will be more clearly evident from the following description, made with reference to a practical embodiment illustrated by way of non-limiting example in the attached drawings, in which:

DESCRIPTION OF THE PREFERRED EMBODIMENTS

Figure 1:
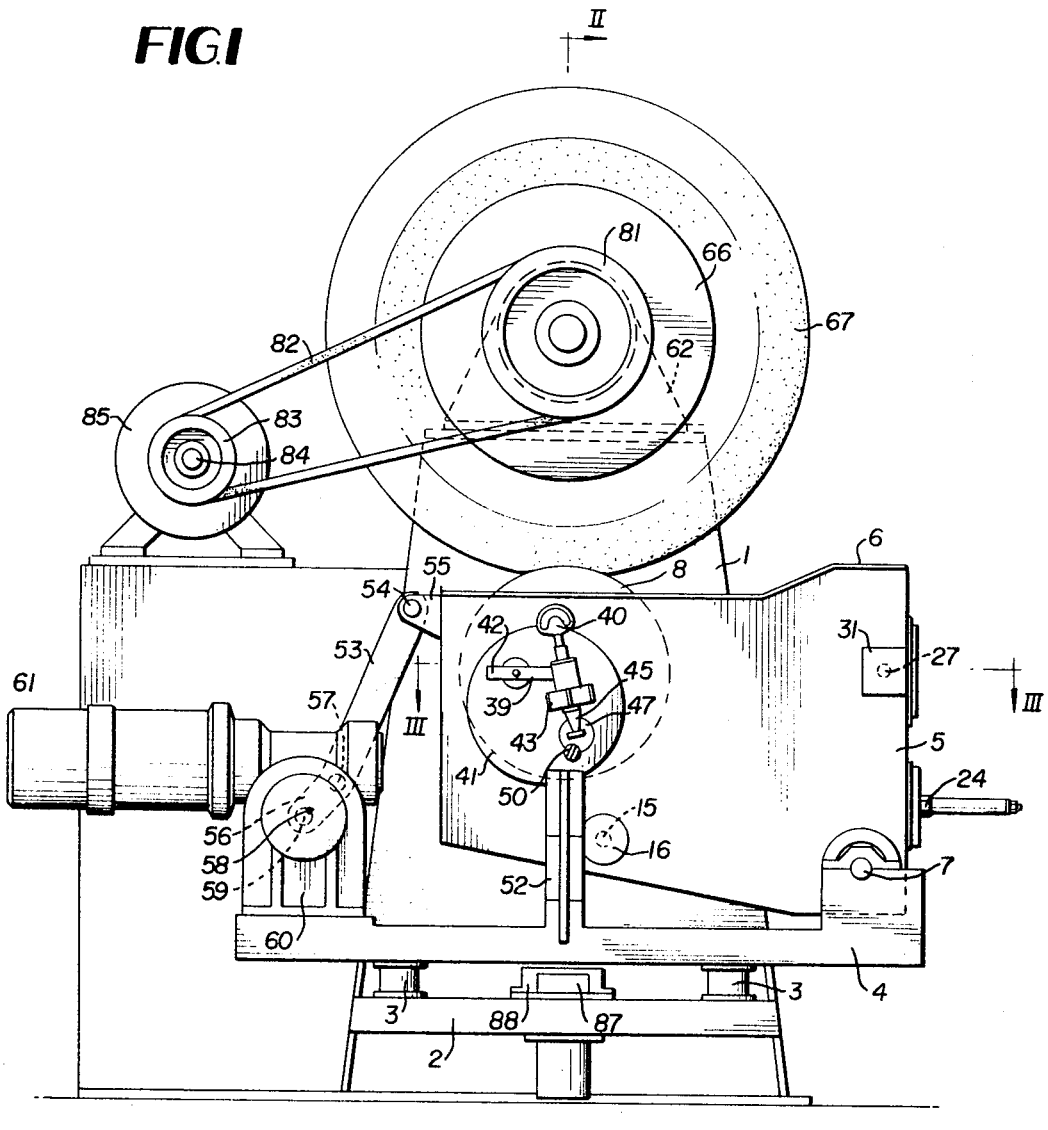
FIG. 1 is a front view of an apparatus according to the invention.
Figure 2:
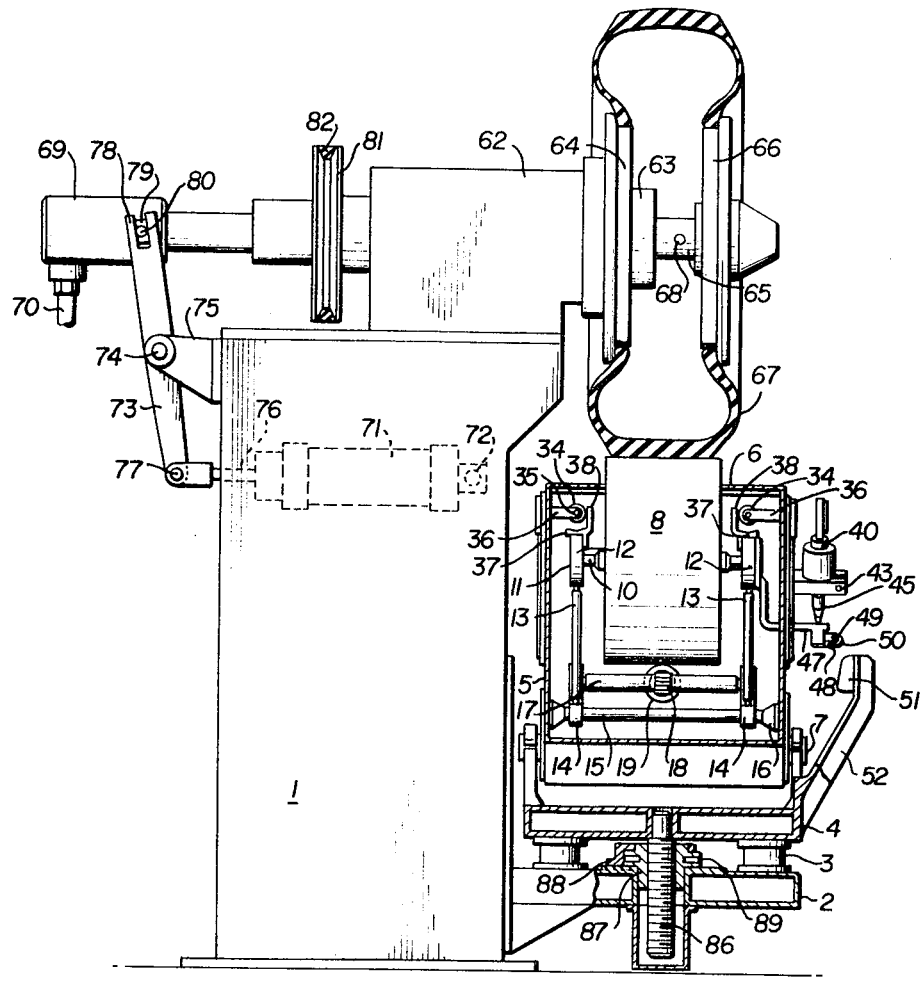
FIG. 2 is a vertical view of the apparatus of FIG. 1, partially sectioned along plane II—II.
Figure 3:
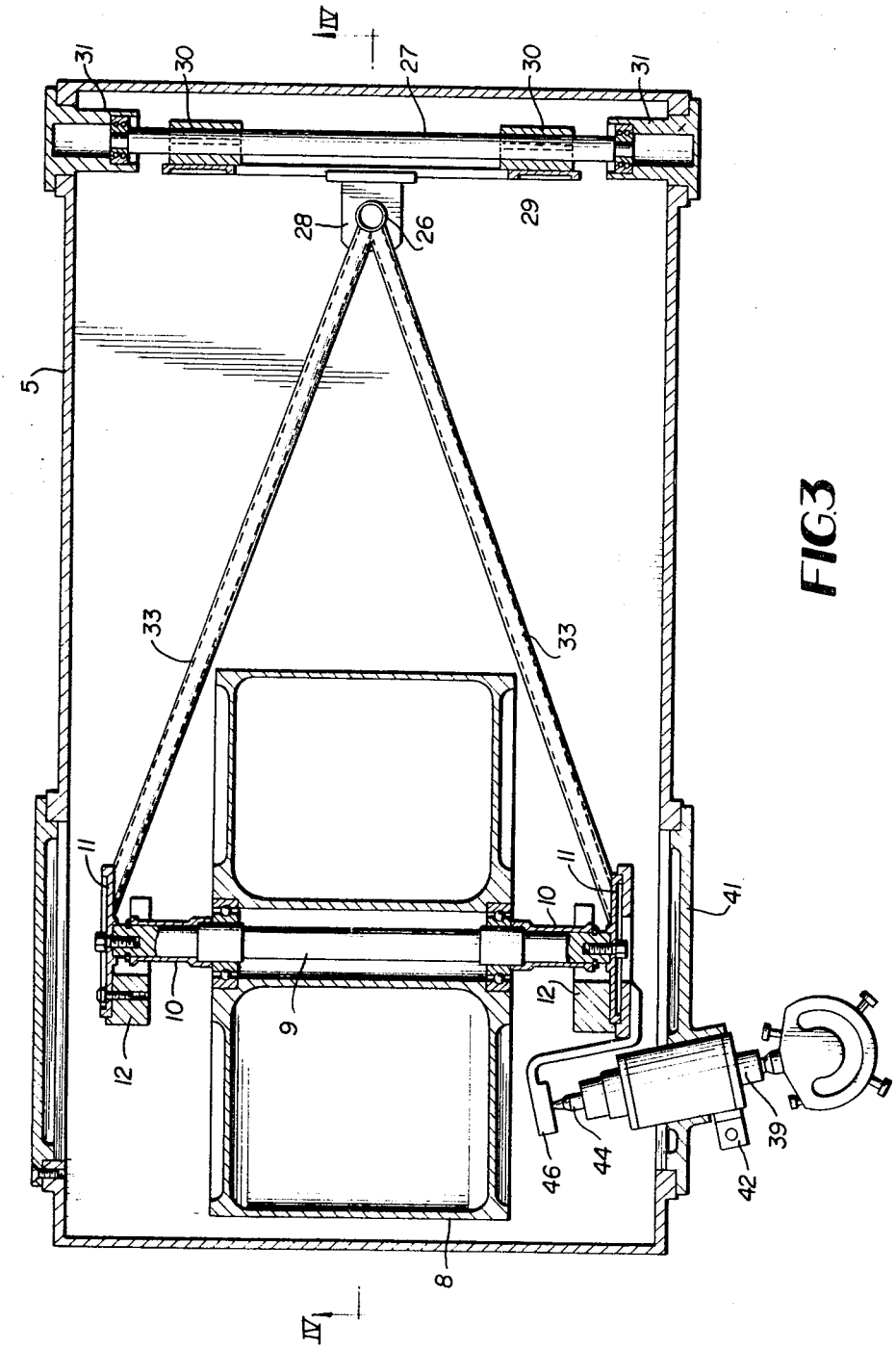
FIG. 3 is a horizontal section of the apparatus of FIG. 1, taken along plane III—III.
Figure 4:
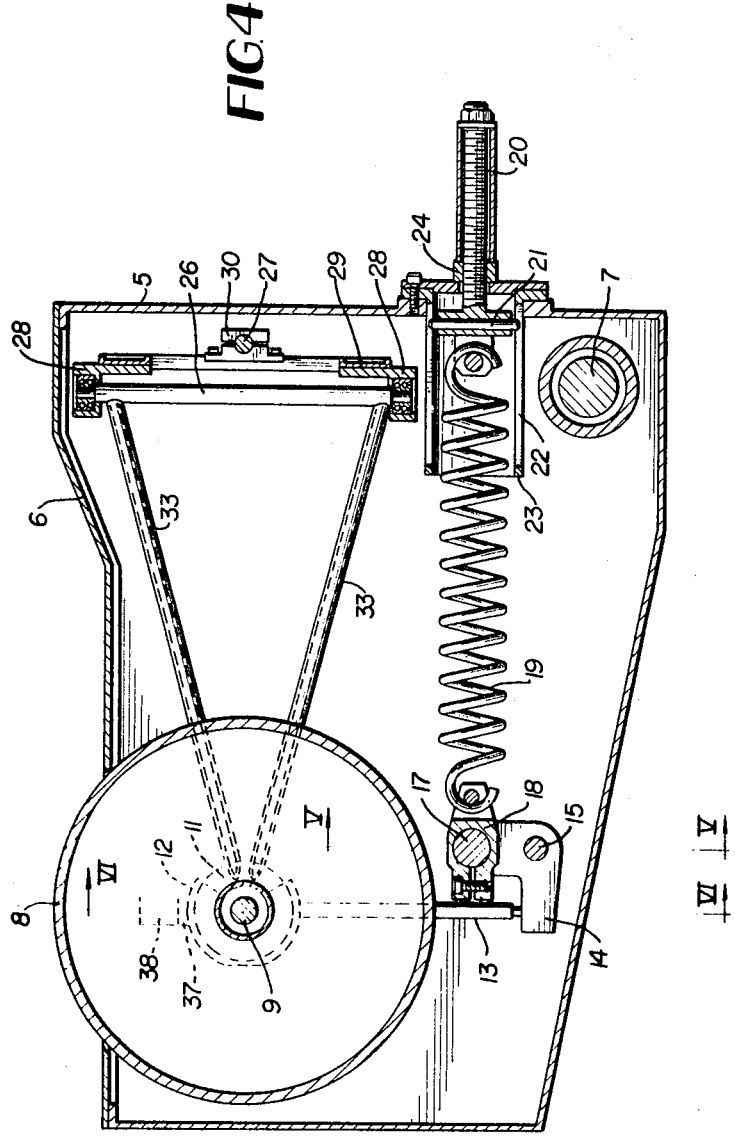
FIG. 4 is a vertical section of the apparatus of FIG. 1, taken along line IV—IV of FIG. 3.
Figure 5:
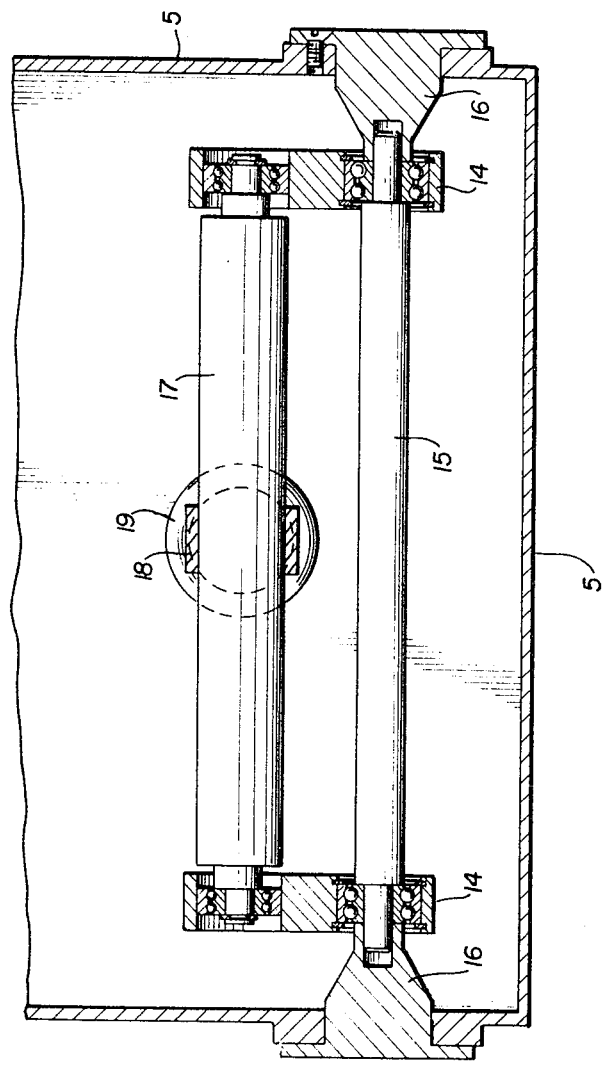
FIG. 5 is a vertical section of the apparatus of FIG. 1, taken along plane V—V of FIG. 4.
Figure 6:
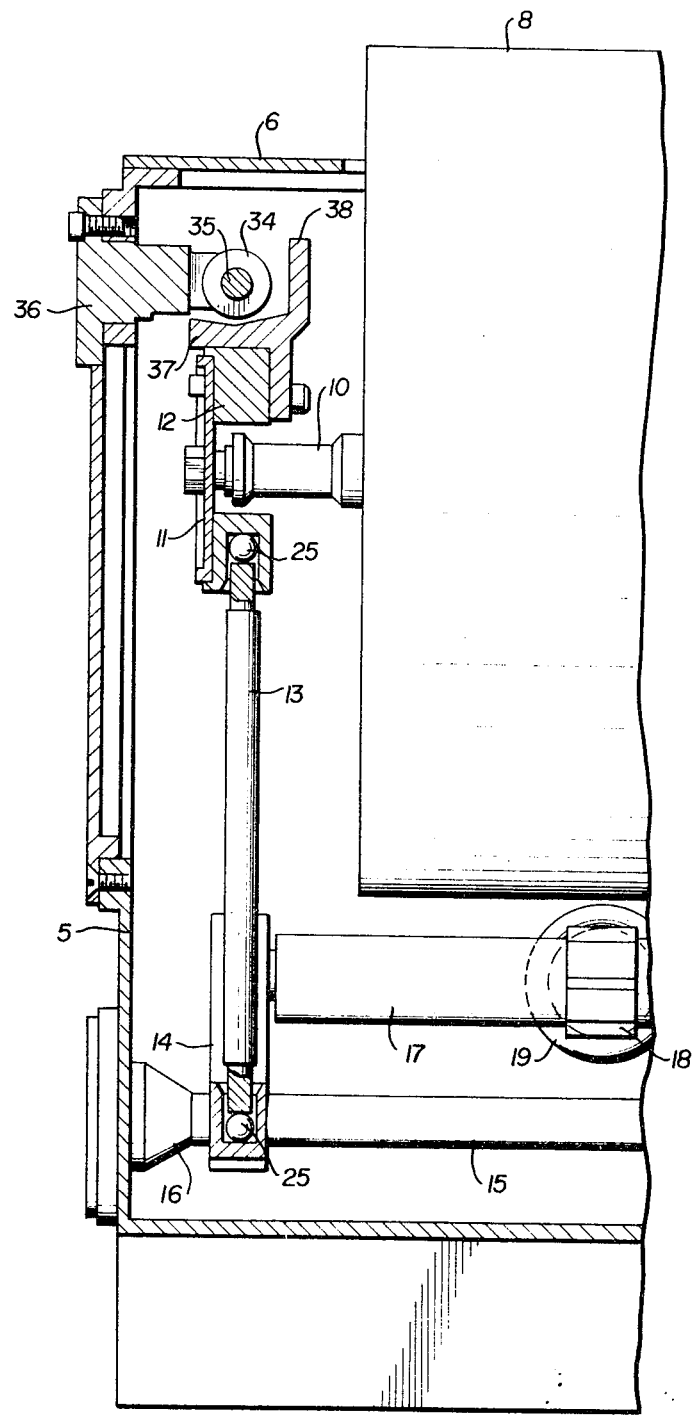
FIG. 6 is a detail in section of the apparatus of FIG. 1, taken along plane VI—VI of FIG. 4.

The apparatus represented in the figures is constituted by a frame 1, carrying a bracket 2 which, through columns 3, supports a table 4. A box 5, provided with a lid 6, and one end of which is pivoted on a shaft 7, is mounted on the table 4. A roller 8, idle on a shaft 9, on which it is kept centered by means of spacers 10, is housed in the box 5. The ends of shaft 9 are secured to two discs 11. These are integral with two half-rings 12 supported by a balance formed by two vertical rods 13, two L-shaped levers 14 having their fulcrum on a pivot 15, supported on its turn by two supports 16, secured to the box 5 in a freely rotatable manner, and by a ledger 17 rotatably assembled at its ends in two oscillating bearings supported by the L-shaped levers 14. A connection 18 for one end of a spring 19, having a high elastic constant, is provided at the center of ledger 17. The other end of the spring 19 is hooked to a tension rod 20, one end of which is provided with a pin 21, axially slidable in the two longitudinal grooves 22, obtained in the bush 23, which prevent the tension rod 20 from rotating about itself when the load of the spring 19 is varied by means of the nut 24. The vertical rods 13 have very hard flat terminal faces and are free to oscillate on balls 25, also very hard, respectively inserted in the half-rings 12 and on the L-shaped levers 14. The roller 8 can oscillate about a universal joint constituted by a vertical shaft 26 and a horizontal shaft 27. The vertical shaft 26 is rotatably assembled in supports 28, integral with a disc 29, to which clamps 30 are fast. The horizontal shaft 27, on its turn rotatably assembled in supports 31 sustained by the box 5, is fixed in said clamps 30.

The roller 8 is connected to the universal joint by means of a very light frame, constituted by two pairs of rods 32 and 33. The rods of each pair are spread outward by starting from one end of the vertical shaft 26, with which they are integral, to be inserted in the disc 11 supporting the shaft 9.

The box 5 contains two rollers 34, rotatably assembled on pins 35 of supports 36, integral with the box 5. The rollers 34 have the task of stopping the upward rotation of the roller 8 and of its relative frame under the thrust of the loaded spring 19. The rollers 34 serve also for centering the roller 8 in the box 5. Said stop and centering take place when the rollers 34 come into contact with appropriate plates 37, whose upper surface is V-shaped. Each plate 37 is provided with a vertical projection 38, having the purpose of limiting the lateral oscillation of roller 8. The amplitude of the lateral and vertical oscillations of the roller 8 is respectively determined by means of the measuring devices 39,40 of the type described in Italian Application 15 530 filed on the 14th Apr., 1969,by the same applicant.

An embodiment of these devices comprises a feeling shank axially shiftable in both senses independently of or integrally with a coaxial rod axially shiftable within two pre-established limits, to originate the displacement of a pointer, with respect to a base value corresponding to one of said limits, one end of said rod being inserted in an axial hole of the feeling shank and moreover a first friction element, interposed between said end of the rod and the feeling shank, a first elastic element acting on said rod to insert it in the feeling shank, a second elastic element acting on the shank to detach it from said end of the rod as far as a pre-established limit, the resistance opposed to said independent movement of the feeling shank and of the rod in the two directions being always greater than the thrust exerted by said first elastic element on said rod and always smaller than the thrust exerted by said second elastic element on said shank.

The measuring devices 39 and 40 are fastened to a lateral lid 41 of the box 5 by means of collars 42 and 43, and their feeling shanks 44 and 45 are actuated by levers 46 and 47 integral with one of discs 11 supporting the roller 8.

The levers 46 and 47 are appropriately disposed in such a way that their plane of contact with the feeling shanks 44 and 45 of the devices 39 and 40 passes respectively through the vertical shaft 26 and the horizontal shaft 27 of the universal joint. Moreover, the lever 47 is fast with a fork 48, carrying a pin 49, on which is rotatably assembled the small roll 50 intended to displace laterally the roller 8 when said small roll 50 comes into contact with the cam 51, fixed to the arm 52 integral with the table 4, during the downward rotation of the box 5 about the pivot 7. In order to determined the rotation in both directions of the box 5 about the pivot 7, provision is made of a linkage constituted by a connecting rod 53, pivoted on a pin 54 mounted in a fork 55 fast with the box 5 and by a crank 56, one end of which is pivoted on a pin 57 mounted at one end of the connecting rod 53. The other end of the crank 56 is secured, by means of a key 58, to the slow shaft 59 of a reduction gear 60, driven by the self-braking motor 61.

The frame 1 carries a support 62, on which a hollow shaft 63 is rotatably assembled; a rim 64 is mounted at one end of said shaft 63. Inside the hollow shaft 63, a hollow mandrel 65, provided at one of its ends with a rim 66, is slidably mounted. The rims 64 and 66 are peripherally provided with a flange intended to receive the beads of a tire 67, which can be inflated with compressed air, admitted to its inside through the opening 68. The other end of mandrel 65 is provided with a rotary joint 69, which can be alternatively connected with a source of compressed air or with an exhaust by means of a tube 70.

With appropriate means, not represented in the figures, the hollow mandrel 65 can be kept in working position with respect to the hollow shaft 63 during the tire inflation, or can be disengaged, so as to slide axially with respect to said shaft, so that the rims 64 and 65 can be spaced apart in order to facilitate the fitting and the unfitting of the tire 67. This axial movement is controlled by a double-acting pneumatic cylinder 71, hinged on the frame 1 by means of a pin 72, and by a lever 73, hinged in a pin 74, supported by a support 75 integral with said frame 1.

One end of lever 73 is hinged in the stem 76 of cylinder 71 by means of a pin 77, whilst the other end of said lever is provided with a fork 78, within which slide two sliding blocks 79, hinged in pins 80 fast with the rotary joint 69 and disposed at the two sides of the latter. The hollow mandrel 65, although it is able to slide within the hollow shaft 63, is integral with the latter during the rotation, which is controlled by means of a pulley 81, fast with the hollow shaft 63 and connected through a V-belt 82 to a pulley 83, keyed on the shaft 84 of a reduction gear 85.

In order to vary the vertical position of the table 4 carrying the box 5, according to the variation of the diameter of the tires to be tested, provision is made of a jack, constituted by a screw 86 fast with the table 4, and by a nut screw 87 mounted in a casing 88 integral with the bracket 2.

The jack permits the substitution of the columns 3 with as many columns of appropriate height.

The operation of the above described apparatus is the following : in order to determine the maximum variation of the rolling radius and of the slip angle, during each turn of the tire under load, it is first of all necessary to remove the previously examined tire 67 and to bring again the apparatus in condition to repeat the cycle of necessary operations.

To remove the tire 67, the tube 70 is at first connected to an exhaust in order to eliminate the compressed air from the inside of the tire 67 through the radial hole 68 and the axial hole of the mandrel 65. Then the means which prevent the axial sliding of the latter inside the hollow shaft 63 are unlocked and compressed fluid is admitted from the right end of cylinder 71, while compressed fluid is discharged from the opposite end. In this way, the mandrel 65 is shifted to the right and consequently the rims 64 and 66 are mutually detached. At the same time the crank 56, by means of the motor 61 and the reduction gear 60, is rotated in clockwise direction with respect to the position shown in FIG. 1, as far as the lowest point, with a consequent lowering of the box 5 which rotates in anticlockwise direction about the shaft 7. Now the tire 67 is completely free and can be easily removed.

The next tire is then set in position and the rims 64 and 66 are mutually approached by discharging compressed fluid from the right end of the cylinder 71 and by admitting compressed fluid from the left end of the latter. Then the means able to prevent the relative sliding of the mandrel 65 and of the hollow shaft 63 are operated and the tube 70 is connected to the source of compressed air. In this way the tire is positioned and inflated at a pressure corresponding to the service pressure. Then the crank 56 is rotated clockwise by more than half a turn to bring it again to the position of FIG. 1, originating in this way the rotation of the box 5 in the same direction about the shaft 7. This rotation gives rise to the simultaneous lifting of the box 5 and of the measuring devices 39 and 40, fast with it, as far as the crank 56 and the connecting rod 53 are aligned, whilst, during the next clockwise rotation of the crank 56 from its position of alignment with the connecting rod 53 to the position indicated in FIG. 1, the box 5 rotates anticlockwise and partially lowers again. During the lifting of the box 5, the roller 8 is at first freely raised together with it, then, after having come into contact with the tire to be tested, reaches a higher position, compressing the tire until the reaction of the latter reaches the value of the upward thrust exerted by the spring 19 through the two L-shaped levers 14 and the two rods 13. At this point the upward movement of the roller 8 stops, whilst the box 5 goes on lifting as far as the crank 56 and the connecting rod 53 are aligned, so that the V-shaped surfaces of the plates 37 become spaced from the rolls 34. The lifting of the box 5 disengages the small roll 50 from the surface of the cam 51, so that the roller 8 takes again a centered position with respect to the rolls 34 and the lever 46 pushes the feeling shank 44 into the device 39 for a length at least sufficient to bring the rod of said device against the stop foreseen for its stroke in said direction, and in case to cause it to slide along the rod, overcoming the resistance opposed by the friction element. The displacement of the feeling stem 44 is therefore of the order of magnitude of the stroke between the stops of the rod of device 39, and the pointer of this device will indicate therefore the value taken as a base for the measurement of the slip angle. At last, the box lifting — after the roller 8 has set in its position of equilibrium against the tire — originates a detachment of the device 40 from the lever 47 and consequently an axial displacement of the feeling shank 45 towards the outside.

During the above described partial second lowering of the box 5, corresponding to a length of the order to magnitude of the stroke between said stops of the rods of the measuring device 40, the roller 8 remains in the above equilibrium position, so that also the small roll 50 is disengaged, whilst the rolls 34 are partially approached to the plates 37 and the feeling shank 45 of device 40 is pressed against the lever 47 and suffers an axial displacement towards the inside of the apparatus, which is at least sufficient to bring the rod therein contained against the stop foreseen for its stroke in said direction, and in case also to originate a sliding of the feeling shank 45 along the rod, overcoming the resistance opposed by the friction element. The pointer of the device 40 will then indicate the value taken as a base for the measurement of the variation of the rolling radius of the tire under load.

At this moment, the tire is rotated clockwise with respect to FIG. 1 by means of the reduction gear 85 and the belt drive 83, 82, 81, which impart a rotation to the hollow shaft 63 and to the hollow mandrel 65, integral with it during rotation, and consequently to the rims 64 and 66 supporting the tire. During this rotation, the tire will drag into rotation the roller 8 in opposite direction, and said roller 8 will freely oscillate in the two senses about the horizontal shaft 27 and the vertical shaft 26, coming into contact with zones which have geometrical and elastic characteristics different from those corresponding to the initial point of contact between said roller 8 and the tire. During the first whole turn of the tire, the feeling shanks 44 and 45 will be further pushed into the corresponding devices 39 and 40 if the roller 8 suffers angular displacements about the axles of the universal joint, respectively in the direction of the cam 51 or in the direction of the axis of rotation of the tire; as the rods are already into contact with the stop of their stroke towards the inside of the corresponding devices, the feeling shanks will slide along said rods, overcoming the resistance of the friction elements and of the elastic means which tend to detach them from the rods, and will maintain this position, with respect to the rods, even if the roller should then be pushed by the tire in a direction opposite to the axis of rotation of the tire itself and to the cam 51, respectively. Therefore, at the end of this first turn, the mutual position of the shanks and of the relative rods of the devices 39 and 40 will certainly correspond to that taken by them on the occasion of the maximum oscillation of the roller about the axles of the universal joint, respectively in the direction of the axis of rotation of the tire and of the cam 51. On that occasion, the pointers still indicate the base value, since the rods are unable to suffer a further displacement towards the inside of the relative device, but only a sliding of the shanks along their respective rods has taken place.

Then a second turn of the tire in the same direction is carried out; during this turn the pointers of the devices 39 and 40 will displace, with respect to the base values, whenever the roller 8 is in a position below that corresponding to the maximum upward oscillation suffered by it during the first turn or whenever said roller is angularly displaced in a direction opposite to the cam 51 with respect to the maximum oscillation suffered by it during the first turn in the direction of said cam. Therefore, it will be easy to determine the differential value of the magnitude measured by each device 39 or 40 by reading on their dial the value of the maximum deviation of the pointer from the base value. In the same manner it will be possible to determine whether said differential value is contained or not within one or more pre-established tolerance limits.

At the end of the second turn of the tire, the reduction gear 85 is stopped, the device is brought again to its rest condition, and the tire is removed as explained at the beginning.

It is understood that some modifications in the construction of the above described device can be made without falling out of the scope of the present invention. So, for instance, the determination of the oscillations of the roller 8 about the axles of the universal joint can be carried out with means different from the devices provided with a feeler, for instance of optical type, and said means can be disposed in a different place with respect to the roller 8.

The compression of the tire can be effected by pressing it against the roller, and not viceversa. Likewise, the rotation of the roller, instead of that of the tire, can be controlled.

Further, the elements constituting the apparatus can be arranged in such a way that both of the axes of oscillation of the roller are horizontal.

Moreover, the devices for the recording of the data — as explained in the above mentioned application — can be provided with electric contacts, which can be displaced in the position corresponding to a pre-established limit value and can be connected to a system of visual or acoustical signaling, which warns when the values corresponding to said limits are exceeded.

What is claimed is:

1. A method for determining irregularities in the behavior of tires rotating under load, comprising placing the periphery of the tire under test in contact with a rigid cylindrical surface with the axis of said cylindrical surface parallel to the tire axis compressing said tire against said surface by application of an elastic pressure therebetween, said cylindrical surface being adapted to oscillate about at least an axis lying in its median plane and perpendicular to the axis of said surface, placing the tire and said cylindrical surface into rotation in opposite sense by controlled rotation of one of the two, and determining the angular displacements of the axis of said cylindrical surface about said axis of oscillation, resulting from variations of the lateral thrust, during each turn of the tire, in the zone of contact of the tire with said cylindrical surface.

2. A method according to claim 1, in which the cylindrical surface is adapted to oscillate also about an axis lying in a plane perpendicular to said first axis of oscillation and passing through a diametrical plane of said cylindrical surface, evaluating the angular displacements of the axis of said cylindrical surface about said second axis of oscillation, resulting from the variations of the rolling radius during each turn of the tire, and determining the mutual compression between the tire and said cylindrical surface.

3. A method according to claim 1, in which the angular displacements of the axis of said cylindrical surface about each of said axes of oscillation are determined by evaluating the angular displacements of a plane passing through the axis of the oscillation in question and integral with the axis of the cylindrical surface.

4. An apparatus for determining irregularities in the behavior of tires rotating under load which comprises: a rigid cylinder rotatably mounted on a shaft and adapted to oscillate at least about an axis lying in its median plane and perpendicular to the shaft of said cylindr,means for rotably mounting a tire to be tested, means for producing an elastic compression between said rigid cylinder and said tire to be tested, means for simultaneously rotating said tire in one direction and said cylinder in the opposite direction, and means for measuring the angular displacements of the shaft of said cylinder about said axis of oscillation, during rotation of said cylinder which are caused by variations of the lateral thrust, during a turn of the tire, at the compression zone between said tire and said rigid cylinder.

5. An apparatus according to claim 4, in which the rigid cylinder is also adapted to oscillate about an axis lying in a plane perpendicular to said first axis of oscillation and passing through a diametrical plane of said cylindrical surface, and having means for determining the angular displacements of the shaft of said cylinder about said second axis of oscillation, caused by variations of the rolling radius of the tire during each turn of the latter, at the compression zone of said tire and said rigid cylinder.

6. An apparatus according to claim 5, in which the shaft for the rigid cylinder is supported by a balance, said balance comprising two rods, each terminal face of which is in contact with and freely oscillatable upon a ball inserted in a seat at one end of the cylinder shaft and in two levers each having its fulcrum on a fixed pivot, freely rotatable and parallel to the cylinder shaft, and by a ledger parallel to said pivot and rotatably assembled at its ends in two oscillating supports sustained by said lever, and the means for producing said elastic compression comprising a helical spring having one end thereof fixed at the middle portion of said ledger.

7. An apparatus according to claim 6, in which the shaft of the rigid cylinder is connected by means of a frame to a vertical shaft constituting said axis of oscillation.

8. An apparatus according to claim 7, in which the frame comprises two pairs of thin rods which, starting from the opposite ends of said vertical shaft, spread out to reach the supports of the cylinder shaft.

9. An apparatus according to claim 7, in which the fixed pivot on which the levers of the balance are fulcrumed is supported at its ends by a box which is adapted for movement toward and away from the tire to be tested.

10. An apparatus according to claim 9, in which said box is rotatably assembled on a shaft parallel to the shaft supporting the cylinder.

11. An apparatus according to claim 9, in which the end of the spring which is opposite to that connected to the balance is fixed to said box through a means adapted to vary its axial position.

12. An apparatus according to claim 11, in which means are provided for preventing rotation of the spring about its own axis during the adjustment of the axial position of its end fixed to the box.

13. An apparatus according to claim 9 in which the box is mounted upon a table and a plurality of interchangeable columns of different heights are provided supporting said table at different vertical positions above the base of the apparatus.

14. Apparatus according to claim 13, in which means are provided for adjusting the distance between said table and said base during changes in columns.

15. An apparatus according to claim 5, in which a shaft rotatably mounted at its ends within supports integral with the box, constitutes the second axis of oscillation.

16. An apparatus according to claim 6, in which means are provided for recentering the rigid cylinder when it is brought out of its equilibrium position in consequence of an angular displacement about its first axis of oscillation comprising two elements having V-shaped surfaces, each of which is rigidly affixed to one of the supports of the shaft of the rigid cylinder, and a small rod, cooperating with each of said surface and rotatably assembled on said box.

17. An apparatus according to claim 16, in which the small rolls constitute also means for limiting the oscillation of the rigid cylinder in the direction of the compression thrust.

18. An apparatus according to claim 5, in which the means for measuring the angular displacements of the shaft of said cylinder about at least one of said axes of oscillation are constituted by devices, comprising a feeling shank adapted to move axially in both directions independently of or jointly with a coaxial rod adapted to move axially within two preestablished limits, to originate the displacement of a pointer, with respect to a base value corresponding to one of said limits, a friction element adapted to resist the independent movement of said shank and of said rod, a first elastic element urging said rod toward the feeling shank, a second elastic element acting on said shank to detach it from the rod, the resistance to said independent movement of the feeling shank and of the rod being always greater than the thrust exerted by said first elastic element on said rod and always smaller than the thrust exerted by said second elastic element on said stem.

19. An apparatus according to claim 18, in which, for each device determining the oscillations of the shaft of the rigid cylinder about one of said axes of oscillation, provision is made of a plane integral with said shaft, passing through said axis of oscillation and perpendicular to the feeling shank with which it is in contact.

20. An apparatus according to claim 19, in which the devices for determining the oscillations of the shaft of the rigid cylinder about said axes of oscillation are integrally mounted on said box and have their feeiling shanks arranged perpendicularly to said planes.

21. An apparatus according to claim 18, in which means are provided for rotating the box about said shaft in a direction approaching the tire to be tested, and then for rotating the box in the opposite direction by an angle corresponding to a lowering of it of the order of magnitude of the stroke between the two limits of the rods of the device for determining the angular displacements of the shaft of the rigid cylinder about the second axis of oscillation.

22. An apparatus according to claim 18, in which means are provided for maintaining the rigid cylinder, while it is in rest position, rotated about the first axis of oscillation by an angle corresponding to an axial displacement of the feeling shank of the device for determining the angular displacements of the shaft of the rigid cylinder about the first axis of oscillation, of the order of magnitude of the stroke between said two limits of said device.

23. An apparatus according to claim 22, in which the means for maintaining the rigid cylinder rotated about the first axis of oscillation while it is in rest position comprises a fixed cam cooperating with a small roll supported by the shaft of the rigid cylinder.

24. An apparatus according to claim 23, in which said cam is integral with a table, which supports the shaft on which the box is pivoted.

* * * * *